United States Patent
Hao et al.

(10) Patent No.: US 11,180,419 B2
(45) Date of Patent: Nov. 23, 2021

(54) METHOD FOR PREPARATION OF DENSE HFC(SI)—HFB₂ COMPOSITE CERAMIC

(71) Applicant: SHANGHAI JIAO TONG UNIVERSITY, Shanghai (CN)

(72) Inventors: Wei Hao, Shanghai (CN); Xiaofeng Zhao, Shanghai (CN); Na Ni, Shanghai (CN); Huangyue Cai, Shanghai (CN); Yao Yao, Shanghai (CN); Meiyu Yi, Shanghai (CN); Fangwei Guo, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/187,725

(22) Filed: Feb. 26, 2021

(65) Prior Publication Data
US 2021/0179499 A1 Jun. 17, 2021

Related U.S. Application Data

(63) Continuation of application No. PCT/CN2019/090157, filed on Jun. 5, 2019.

(30) Foreign Application Priority Data

Dec. 23, 2018 (CN) .......................... 201811576879.9

(51) Int. Cl.
*C04B 35/56* (2006.01)
*C04B 35/626* (2006.01)
*C04B 35/645* (2006.01)

(52) U.S. Cl.
CPC ...... *C04B 35/5622* (2013.01); *C04B 35/6261* (2013.01); *C04B 35/6264* (2013.01);
(Continued)

(58) Field of Classification Search
CPC .............. C04B 35/5622; C04B 35/645; C04B 35/6264; C04B 35/62655; C04B 35/6261;
(Continued)

(56) References Cited

U.S. PATENT DOCUMENTS 5,296,417 A * 3/1994 Claar .................. C04B 35/5611
501/87
5,750,450 A 5/1998 Bull et al.
(Continued)

FOREIGN PATENT DOCUMENTS

CN 101104561 A 1/2008
CN 100378035 C 4/2008
(Continued)

OTHER PUBLICATIONS

Rejasse et al. TEM study of the reaction mechanisms involved in the carbothermal reduction of hafnia. RSC Adv., 2015, 5, 45341-45350.*
(Continued)

*Primary Examiner* — Noah S Wiese

(57) ABSTRACT

A method for the preparation of a dense HfC(Si)—HfB₂ composite ceramic. hafnium oxide powders, nano-sized carbon black and silicon hexaboride powders are mixed in a molar ratio of (1-10):(1-20):(1-5) to obtain a powder mixture. The powder mixture is subjected to ball milling, dried and transferred to a graphite mold for spark plasma sintering. In this way, an in-situ carbon-boron reduction reaction and the sintering densification are completed in one step, and the obtained HfC(Si)—HfB₂ composite ceramic has a density of 94.0%-100% and uniformly dispersed grains.

10 Claims, 2 Drawing Sheets

(52) U.S. Cl.
CPC ...... *C04B 35/62655* (2013.01); *C04B 35/645* (2013.01); *C04B 2235/3813* (2013.01); *C04B 2235/3839* (2013.01); *C04B 2235/428* (2013.01); *C04B 2235/5436* (2013.01); *C04B 2235/5445* (2013.01); *C04B 2235/5454* (2013.01); *C04B 2235/606* (2013.01); *C04B 2235/6562* (2013.01); *C04B 2235/6567* (2013.01); *C04B 2235/6581* (2013.01); *C04B 2235/666* (2013.01); *C04B 2235/77* (2013.01)

(58) Field of Classification Search
CPC ...... C04B 2235/606; C04B 2235/3839; C04B 2235/5454; C04B 2235/428; C04B 2235/77; C04B 2235/3813; C04B 2235/666
See application file for complete search history.

(56) References Cited

U.S. PATENT DOCUMENTS

| | | | |
|---|---|---|---|
| 6,979,490 B2 | 12/2005 | Steffier | |
| 2011/0030440 A1* | 2/2011 | Keane | C04B 35/117 72/274 |
| 2015/0291814 A1* | 10/2015 | Castano | C09D 7/68 252/62 |

FOREIGN PATENT DOCUMENTS

| | | |
|---|---|---|
| CN | 102503427 A | 6/2012 |
| CN | 103979974 A | 8/2014 |
| CN | 104671245 A | 6/2015 |
| CN | 109678511 A | 4/2019 |

OTHER PUBLICATIONS

Sciti et al. Densification and Mechanical Behavior of HfC and HfB2 Fabricated by Spark Plasma Sintering. J. Am. Ceram. Soc., 91 [5] 1433-1440 (2008).*

R. Licheri, R. Omu, C. Musa, A.M. Locci, G. Cao; Consolidation via spark plasma sintering of HfB2/SiC and HfB2/HfC/SiC composite powders obtained by self-propagating high-temperature synthesis; Nov. 30, 2008; Journal of Alloys and Compounds.

Lun Feng, Sea-Hoon Lee, Jie Yin. Low-Temperature Sintering of HfC/SiC Nanocomposites Using HfSi2—C Additives [J]. Journal of the American Ceramic Society, 99 (2016) 2632-2633.

Sufang Tang, Chenglong Hu. Design, Preparation and Properties of Carbon Fiber Reinforced Ultra-High Temperature Ceramic Composites for Aerospace Applicatiors: A Review [J]. Journal of Materials Science & Technology. 33 (2017) 117-130.

Ji-Xuan Liu, Yan-Mei Kan, Guo-Jun Zhang. Synthesis of Ultra-Fine Hafnium Carbide Powder and its Pressureless Sintering [J]. Journal of the American Ceramic Society, 93 (2010) 980-986.

Shi-Kuan Sun, Guo-Jun Zhang, Ji-Xuan Liu, el al. Reaction Sintering of HfC/W Cermets with High Strength and Toughness [J]. Journal of the American Ceramic Society, 96 (2013) 867-872.

S.Venugopal1, A.Paul1, B. Vaidhyanathan et al., Nano-crystalline ultra high temperature HfB2 and HfC powders and coatings using a Sol-Gel approach [J]. Advanced Ceramic Coatings and Materials for Extreme Environments. 32 (2011) 151-160.

Jincui Ren, Yulei Zhang, Jinhua Li, et al., Effects of deposition temperature and time on HfC nanowires synthesized by CVD on SiC-coated C/C composites [] Ceramics International. 42 (2016) 5623-5628.

Omar Cedillos-Barraza, Salvatore Grasso, Nasrin Al Nasiri, et al., Sintering behavior, solid solution formation and characterization of TaC, HfC and TaC—HfC fabricated by spark plasma sintering [J]. Journal of the European Ceramic Society. 36 (2016) 1539-1548.

Liuyi Xiang, Laifei Cheng, Yi Hou, et al., Fabrication and mechanical properties of laminated HfC—SiC/BN ceramics [J]. Journal of the European Ceramic Society 34 (2014) 3635-3640.

Zapala-Solvas, D. D. Jayaseelan, H. T. Lin, P. Brown, W. E. Lee. Mechanical properties of ZrB2- and HfB2-based ultra-high temperature ceramics fabricated by spark plasma sintering [J]. Journal of the European Ceramic Society 33 (2013) 1373-1386.

Diletta Scitiw et al. Densification and Mechanical Behavior of HfC and HfB2 Fabricated by Apark Plasma Sintering. Journal of the American Ceramic Society, vol. 9, May 6, 2008., 1433-1440.

Yunkai Li et al. Ceramics and composites thereof; Aug. 31, 2007, 244-249.

De-Wei Ni et al. Synthesis of Monodispersed Fine Hafnium Diboride Powders Using Carbo/Borothermal Reduction of Hafnium Dioxide, Communications of the American Ceramic Society, vol. 91, Dec. 31, 2008, 2709-2712.

* cited by examiner

METHOD FOR PREPARATION OF DENSE HFC(SI)—HFB$_2$ COMPOSITE CERAMIC

CROSS-REFERENCE TO RELATED APPLICATIONS

This application is a continuation of International Patent Application No. PCT/CN2019/090157, filed on Jun. 5, 2019, which claims the benefit of priority from Chinese Patent Application No. 201811576879.9, filed on Dec. 23, 2018. The content of the aforementioned applications, including any intervening amendments thereto, is incorporated herein by reference in its entirety.

TECHNICAL FIELD

This application relates to preparation of ultra-high temperature ceramics, and more particularly to a method for the preparation of a dense HfC(Si)—HfB$_2$ composite ceramic.

BACKGROUND

Ultra-high temperature ceramics (UHTCs) are a class of structural materials with a series of excellent characteristics, such as extremely high melting point (>2000° C.), large hardness and Young's modulus, and desirable strength, low thermal expansion coefficient, good thermo-physicochemical stability and high thermal and electrical conductivities under high-temperature conditions, and thus they are considered to have desired resistance to high-temperature ablation. In view of this, the UHTCs have been widely used in the manufacturing of structural components of supersonic aircrafts and solid rockets which are required to have excellent high-temperature resistance, such as nozzles, wing leading edges and hot-end components of engines. In addition, the UHTCs can be also used to make high temperature electrodes and cutting tools.

The ultra-high temperature ceramics are predominated by carbides (HfC, ZrC, TaC, NbC), borides (HfB$_2$, ZrB$_2$, TaB$_2$) and nitrides (HfN, ZrN) of transition metal elements of Groups IV and V in the periodic table, and some refractory metal alloys (Ta, W, Ir) and carbon/carbon composite materials. Among them, the carbides have the highest melting point and superior high-temperature stability, especially, the HfC has a melting point up to 3980° C., a thermal expansion coefficient of 6.73×10$^{-6}$/° C. and a moderate density ($\rho$=12.7 g·cm$^{-3}$). However, the HfC cannot be widely used in the aerospace field due to the following defects: (1) the HfC ceramics have a high melting point and a low self-diffusion coefficient, and thus they are hard to be densified through sintering; (2) as a high temperature structural material, the HfC has a relatively low fracture toughness (2.1-3.4 MPa·m$^{1/2}$); (3) as a high-temperature anti-ablation material, the HfC is prone to oxidation at a service temperature equal to or high than 500° C. in an aerobic environment, which greatly limits its application under high-temperature conditions. HfB$_2$ also has a high melting point (3380° C.), hardness (29 GPa), Young's modulus (480 GPa), electrical conductivity (9.1×10$^6$ S·m$^{-1}$) and thermal conductivity (74-114 W·(m K)$^{-1}$), but its thermal expansion coefficient (6.3× 10$^{-6}$/° C.) and fracture toughness (3.0-6.0 MPa·m$^{1/2}$) are not satisfactory. Compared to the HfC, single-phase HfB$_2$ has good oxidation resistance below 1200° C. due to the formation of liquid B$_2$O$_3$ glass phase. Unfortunately, both HfC and HfB$_2$ ceramics are struggled with difficulties in the sintering densification and low fracture toughness. Therefore, extensive researches have been conducted on the improvement of the sintering process and the toughness of UTHCs such as HfC and HfB$_2$. Moreover, the sintering process in the preparation of ultra-high temperature solid solution composite ceramics is of great significance for the enhancement of sintering and mechanical properties.

Composite ceramics are considered to have desirable sintering performance and fracture toughness, and in their preparation processes, an in-situ reaction sintering can be performed to facilitate diffusion and migration of elements at high temperature, so as to achieve the rapid sintering densification. So far, several preparation methods of HfC and HfB$_2$ ceramics have been developed. For example, carbon black, graphite and HfO$_2$ were subjected to carbothermic reduction to produce powders, which were then sintered to prepare a HfC ceramic (Ji-Xuan Liu, Yan-Mei Kan, Guo-Jun Zhang. Synthesis of Ultra-Fine Hafnium Carbide Powder and its Pressureless Sintering [J]. *Journal of the American Ceramic Society*, 93 (2010) 980-986). HfO$_2$ and WC were used as raw materials to prepare HfC/W cermets and HfC/SiC ceramics through reaction sintering (Shi-Kuan Sun, Guo-Jun Zhang, Ji-Xuan Liu, et al. Reaction Sintering of HfC/W Cermets with High Strength and Toughness [J]. *Journal of the American Ceramic Society*, 96 (2013) 867-872; Lun Feng, Sea-Hoon Lee, Jie Yin. Low-Temperature Sintering of HfC/SiC Nanocomposites Using HfSi$_2$—C Additives [J]. *Journal of the American Ceramic Society*, 99 (2016) 2632-2638). HfCl$_4$ and phenolic resin were used as a Hf source and a carbon source respectively to prepare HfC nano-powders and coatings using a sol-gel approach (S. Venugopal, A. Paul, B. Vaidhyanathan et al., Nano-crystalline ultra high temperature HfB$_2$ and HfC powders and coatings using a Sol-Gel approach [J]. *Advanced Ceramic Coatings and Materials for Extreme Environments*. 32 (2011) 151-160). In addition, chemical vapor deposition (CVD) was applied to the preparation of HfC anti-ablation coatings (Jincui Ren, Yulei Zhang, Jinhua Li, et al., Effects of deposition temperature and time on HfC nanowires synthesized by CVD on SiC-coated C/C composites [J]. *Ceramics International*. 42 (2016) 5623-5628), and some ultra-high temperature ceramic composites are prepared by chemical vapor infiltration (CVI), reactive melt infiltration (RMI) or precursor impregnation pyrolysis (PIP) (Sufang Tang, Chenglong Hu. Design, Preparation and Properties of Carbon Fiber Reinforced Ultra-High Temperature Ceramic Composites for Aerospace Applications: A Review [J]. *Journal of Materials Science & Technology*. 33 (2017) 117-130). All the above-mentioned preparation methods of HfC and HfB$_2$ ceramics and coatings require steps of reacting raw materials at a temperature higher than 1500° C. to prepare a powder and then sintering the powder at a temperature higher than 2000° C. Moreover, under such temperatures, the phase composition and grain size cannot be effectively controlled, and the raw material HfO$_2$ is so refractory that it fails to thoroughly diffuse at a temperature below 1500° C. As for the CVD method, it can only be used for the deposition of HfC coatings or nanowires, and has low preparation efficiency and great difficulty in the process control. It is less likely to produce a dense sintered product using the CVI, RMI or PIP method, and these approaches may also introduce impurities during the preparation, and have drawbacks of high requirements for equipment, large time consumption and high cost. In addition, the HfC precursor is not readily available, allowing for an increased cost. Various sintering approaches have been applied to the preparation of UHTCs, such as spark plasma sintering (SPS) (Omar Cedillos-Barraza, Salvatore Grasso, Nasrin Al Nasiri, et al., Sintering behavior, solid solution formation and characterization of TaC, HfC and TaC-HfC fabricated by spark plasma sintering [J]. Journal of the European Ceramic Society. 36 (2016) 1539-1548), hot-pressing sintering (Liuyi Xiang, Laifei Cheng, Yi Hou, et al., Fabrication and mechanical properties of laminated HfC-SiC/BN ceramics [J]. *Journal of the European Ceramic Society* 34 (2014) 3635-3640; E. Zapata-Solvas, D. D. Jayaseelan, H. T. Lin, P. Brown, W. E. Lee. Mechanical properties of $ZrB_2$- and $HfB_2$-based ultra-high temperature ceramics fabricated by spark plasma sintering [J]. *Journal of the European Ceramic Society* 33 (2013) 1373-1386) and pressureless sintering (Ji-Xuan Liu, Yan-Mei Kan, Guo-Jun Zhang. Synthesis of Ultra-Fine Hafnium Carbide Powder and its Pressureless Sintering [J]. *Journal of the American Ceramic Society* 93 (2010) 980-986). However, these sintering methods do not refer to the in-situ reaction, and are all performed at 1800-2400° C., rendering it difficult to control. Interestingly, with the help of the in-situ reaction, the above-mentioned defects in the existing sintering process of ultra-high temperature HfC and $HfB_2$ ceramics can be overcome, and the preparation temperature can be lowered to effectively control the grain size. So far, there are few reports about the use of high temperature-resistant $SiB_6$ as boron and silicon sources and nano-sized carbon black as the carbon source to prepare HfC(Si)—$HfB_2$ through the combination of in-situ carbon-boron thermal reduction and the spark plasma sintering.

Chinese patent No. 100378035C discloses a boride-silicon carbide composite ceramic and a preparation method thereof, in which the reactive silicon carbide generated from the pyrolysis of polycarbosilane is reacted with a boride at 1700-1900° C. by hot pressing to produce the dense boride-silicon carbide composite ceramic. The boride mainly includes zirconium boride, titanium boride and hafnium boride. The preparation process enables the product to have desired high-temperature performance without addition of other sintering aids. 1-12 wt % of a metal powder such as silicon, zirconium, titanium, hafnium, or a combination thereof, is introduced in the preparation to absorb the residual carbon from the pyrolysis of polycarbosilane, allowing for enhanced density and mechanical properties. By comparison, the raw materials and reaction system of the above method are different from those used herein, so that the carbon-boron thermal reduction sintering at 1500-1850° C. in the mentioned patent is distinctive from that performed in this application in the mechanism, leading to entirely different final products. In the method provided herein for preparing a HfC(Si)—$HfB_2$ composite ceramic, the one-step in-situ carbon-boron thermal reduction sintering can be performed at 1500-1850° C. due to the use of a special reaction system, which not only improves the densification of ceramics, but also greatly enhances the fracture toughness of composite ceramics.

SUMMARY

An object of this disclosure is to provide a method for the preparation of a HfC(Si)—$HfB_2$ composite ceramic to overcome the defects in the prior art that there are great difficulties in the synthesis of ultra-high temperature ceramics powders and in the sintering of their bulk ceramics. This disclosure employs high-temperature oxidation resistant $SiB_6$ as boron and silicon sources, nano-sized carbon black as carbon source and nano-sized hafnium oxide as hafnium source to prepare a HfC(Si)—$HfB_2$ composite ceramic in one step through an in-situ carbon-boron thermal reduction sintering, where $SiB_6$ and carbon black have good high-temperature electrical conductivity, facilitating enhancing the spark plasma sintering efficiency. In addition, the elements B, C and Si have a high elemental diffusion and mass transfer rate, which efficiently accelerates the in-situ carbonization, boronization and solid-solution reaction. In the conventional powder preparation, it is difficult to control the phase composition and grain size, rendering it difficult to achieve the densification of ceramic in the sintering process. By contrast, the sintered product in this application not only has uniform phase composition and grain size, but also has high density and fracture toughness. The method provided herein for the preparation of a HfC(Si)—$HfB_2$ composite ceramic has simple process and high efficiency, in which the combination of hafnium carbide and hafnium diboride is performed by in-situ reaction, having optimized performance and brilliant application prospect.

The technical solutions of this disclosure are described as follows.

This disclosure provides a method for the preparation of a HfC(Si)—$HfB_2$ composite ceramic, comprising:

(1) mixing hafnium oxide ($HfO_2$) powders having a particle size of 50-500 nm, nano-sized carbon black having a particle size of 50 nm and silicon hexaboride ($SiB_6$) powders having a particle size of 1-5 m in a molar ratio of (1-10):(1-20):(1-5) to obtain a powder mixture;

(2) subjecting the powder mixture obtained in step (1) to ball milling using a planetary ball mill to obtain a ball-milled product; and drying the ball-milled product in an electric blast drying oven at 50-80° C. for 4-10 h to obtain a dried product;

wherein a medium used in the ball milling is isopropanol; a weight ratio of the powder mixture to balls of the planetary ball mill is 1:(4-20); and the ball milling is performed at 200-500 r/min for 6-24 h; and (3) transferring the dried product obtained in step (2) to a graphite mold (diameter 32 mm) covered with graphite paper followed by spark plasma sintering to obtain the HfC(Si)—$HfB_2$ composite ceramic with a density of 94.0%-100% and uniformly dispersed crystal grains;

wherein the spark plasma sintering is performed at a temperature of 1500-1850° C., a pressure of 20-60 MPa and a vacuum degree of 0-1.0 mbar for 5-30 min; and a heating rate is 50-200° C./min.

Compared to the Chinese patent No. 100378035C, this application has the following distinctive features.

(1) Raw Materials

The raw materials used herein are hafnium oxide powders, nano-sized carbon black and silicon hexaboride powders, which can be subjected to the carbon-boron thermal reduction sintering at 1500-1850° C. in terms of chemical thermodynamics and kinetics, and this process is also accompanied by doping of a solid solution. It has been verified by extensive experiments that the simple reaction system provided herein is prone to sintering, and the composition, microstructure and purity of the product HfC(Si)—$HfB_2$ composite ceramic can be readily controlled. In addition, no impurities are introduced.

(2) Preparation Process

Different heating mechanisms of sintering will result in great difference in the reaction mechanism. As described herein, the dense HfC(Si)—$HfB_2$ composite ceramic can be quickly prepared through the combination of the carbon-boron thermal reduction and the spark plasma sintering. Moreover, the nano-sized black carbon is introduced not only as a carbon source to promote the carbon-boron thermal reduction, and but also as a grain boundary phase to adjust the electrical conductivity of the reaction system to improve the sintering densification during spark plasma sintering, promoting the densification of the composite ceramic to enhance the fracture toughness.

(3) Composition and Microstructure of Final Product

This application introduces $SiB_6$ and nano-sized black carbon to prepare the dense HfC(Si)—$HfB_2$ composite ceramic through the carbon-boron thermal reduction sintering, where in the resulting HfC(Si)—$HfB_2$ composite ceramic, HfC and $HfB_2$ grains are dispersedly distributed, and the element Si is diffused into the HfC crystal lattice to form a solid solution. Moreover, the nano-sized carbon black is evenly distributed at the grain boundaries, which effectively improves the fracture toughness of the composite ceramic.

Compared to the prior art, the beneficial effects of this disclosure are described as follows.

(1) This disclosure employs the one-step preparation of a HfC(Si)—$HfB_2$ composite ceramic through an in-situ carbon-boron thermal reduction sintering, where the composition and grain size of the composite ceramic are controllable.

(2) Based on the combination of spark plasma sintering and reaction sintering, the HfC(Si)—$HfB_2$ composite ceramic can be efficiently prepared at relatively low temperatures. Moreover, the grains of different phases are uniformly distributed, and the diffusion of elements leads to the formation of a solid solution, which largely enhances the densification of the composite ceramic during the spark plasma sintering.

(3) The one-step reaction sintering preparation of the HfC(Si)—$HfB_2$ composite ceramic has simple process, readily available raw materials, good controllability in the composition of two phases, and high efficiency.

(4) The HfC(Si)—$HfB_2$ composite ceramic prepared by the method exhibits a significantly enhanced fracture toughness. Specifically, its fracture toughness is tested by three-point bending and single-edge notched beam methods to be 8.52-14.3 $MPa \cdot m^{1/2}$. Interestingly, the composite ceramic can withstand the ablation test at 2500° C. under oxyacetylene flame for 180 s with a linear ablation rate less than 6 $\mu m \cdot s^{-1}$.

(5) Technical parameters involved in this application, such as particle sizes and proportions of raw materials, ball-milling parameters, and the temperature, pressure and vacuum degree used in the spark plasma sintering, are obtained based on a large number of experiments and principles of chemical thermodynamics and kinetics. Only under the above-mentioned technical parameters: raw material mixture ratio, sintering temperature, pressure and holding time, can the one-step in-situ carbon-boron thermal reduction sintering be performed to prepare the desired HfC(Si)—$HfB_2$ composite ceramic. If the particle size and proportion are not within the above-mentioned ranges, the grains will experience an abnormal growth at very high temperatures and pressures, which leads to poor structural and mechanical performances; or it will fail to arrive at the required activation energy at very low temperatures and pressures, failing to achieve the densification of the ceramic through the one-step in-situ carbon-boron thermal reduction sintering. Moreover, if the pressure is too low, the composite ceramic cannot be densified through sintering, which will affect the composition and microstructure of the composite ceramic, rendering the poor mechanical properties and high-temperature ablation resistance. If the vacuum degree exceeds the upper limit, the reactants will be prone to oxidation under a relatively high oxygen partial pressure, resulting in a failure in the in-situ carbon-boron thermal reduction, while a very low vacuum degree will raise high requirements for the equipment, and the target product cannot be obtained.

DETAILED DESCRIPTION OF EMBODIMENTS

Figure 1:
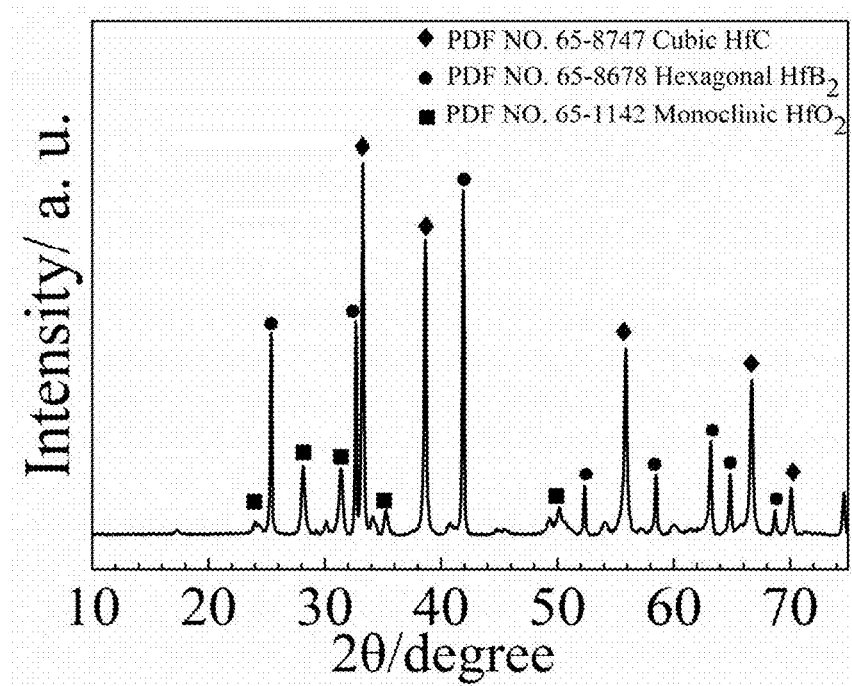
FIG. 1 is an X-ray diffraction (XRD) pattern of a HfC(Si)—$HfB_2$ composite ceramic prepared in Example 3.

This disclosure will be further described below with reference to the embodiments. The embodiments are merely illustrative of this disclosure, and are not intended to limit the disclosure. It should be noted that variations and modifications made by those skilled in the art without departing from the spirit of this disclosure should fall within the scope of the disclosure defined by the appended claims.

Provided herein is a method for the preparation of a HfC(Si)—$HfB_2$ composite ceramic, which is specifically described as follows.

(1) Hafnium oxide ($HfO_2$) powders having a particle size of 50-500 nm, nano-sized carbon black (50 nm) and silicon hexaboride ($SiB_6$) powders having a particle size of 1-5 m are mixed in a molar ratio of (1-10):(1-20):(1-5) to obtain a powder mixture.

(2) The powder mixture obtained in step (1) is subjected to ball milling at 200-500 r/min in a planetary ball mill for 6-24 h to allow the $HfO_2$ powders, the nano-sized carbon black and the $SiB_6$ powders to be uniformly mixed, and then dried at 50-80° C. in an electric blast drying oven for 4-10 h, where a medium used in the ball milling is isopropanol; and a weight ratio of the powder mixture to balls is 1:(4-20).

(3) The reaction mixture obtained in step (2) is transferred to a graphite mold (diameter: 32 mm) covered with graphite paper and subjected to spark plasma sintering at a temperature of 1500-1850° C., a pressure of 20-60 MPa and a vacuum degree of 0-1.0 mbar for 5-30 min to obtain the HfC(Si)—$HfB_2$ composite ceramic with a density of 94.0%-100% and uniformly dispersed grains, where a heating rate of the sintering is 50-200° C./min.

As used herein, the hafnium oxide powders used in the method have a purity ≥99.9%, and are produced by Chaowei-nano Co., Ltd (Shanghai, China); the isopropanol has a purity ≥99.8%; the nano-sized carbon black has a purity ≥99.9%, and is produced by Innochem Co., Ltd (Beijing, China); and the silicon hexaboride powders have a purity ≥98%, and are produced by Alfa Aesar (Shanghai, China).

The planetary ball mill is QM-3SP4 planetary ball mill manufactured by Nanjing University. The electric blast drying oven is DHG-9075A electric blast drying oven produced by Yiheng17 Co., Ltd (Shanghai, China). The spark plasma sintering is carried out in the HPD-25 spark plasma sintering system produced by FCT Systeme GmbH (Rauenstein, Germany).

The technical solutions and beneficial effects of this disclosure will be further described with reference to the embodiments.

Example 1

Provided herein was a method for the preparation of a dense HfC(Si)—$HfB_2$ composite ceramic, which was specifically performed as follows.

(1) Hafnium oxide (HfO$_2$) powders having a particle size of 50 nm, nano-sized carbon black (50 nm) and silicon hexaboride (SiB$_6$) powders having a particle size of 5 μm were mixed in a molar ratio of 5:2:1 to obtain a powder mixture.

(2) The powder mixture obtained in step (1) was subjected to ball milling at 300 r/min in a planetary ball mill for 8 h to allow the HfO$_2$ powders, the nano-sized carbon black and the SiB$_6$ powders to be uniformly mixed, and then dried in an electric blast drying oven at 50° C. for 6 h, where a medium used in the ball milling was isopropanol; and a weight ratio of the powder mixture to balls of the planetary ball mill was 1:10.

(3) The reaction mixture obtained in step (2) was transferred to a graphite mold (diameter: 32 mm) covered with graphite paper, and subjected to spark plasma sintering at a temperature of 1600° C., a pressure of 45 MPa, and a vacuum degree of 0 mbar for 10 min to obtain the HfC(Si)—HfB$_2$ composite ceramic with a density of 96% and uniformly dispersed grains, where a heating rate was 200° C./min.

Example 2

Provided herein was a method for the preparation of a dense HfC(Si)—HfB$_2$ composite ceramic, which was specifically performed as follows.

(1) Hafnium oxide (HfO$_2$) powders having a particle size of 100 nm, nano-sized carbon black (50 nm) and silicon hexaboride (SiB$_6$) powders having a particle size of 4 μm were mixed in a molar ratio of 10:5:3 to obtain a powder mixture.

(2) The powder mixture obtained in step (1) was subjected to ball milling at 350 r/min in a planetary ball mill for 12 h to allow the HfO$_2$ powders, the nano-sized carbon black and the SiB$_6$ powders to be uniformly mixed, and then dried in an electric blast drying oven at 60° C. for 8 h, where a medium used in the ball milling was isopropanol; and a weight ratio of the powder mixture to balls of the planetary ball mill was 1:15.

(3) The reaction mixture obtained in step (2) was transferred to a graphite mold (diameter: 32 mm) covered with graphite paper, and subjected to spark plasma sintering at a temperature of 1700° C., a pressure of 35 MPa, and a vacuum degree of 0.5 mbar for 20 min to obtain the HfC(Si)—HfB$_2$ composite ceramic with a density of 98% and uniformly dispersed grains, where a heating rate was 100° C./min.

Example 3

Provided herein was a method for the preparation of a dense HfC(Si)—HfB$_2$ composite ceramic, which was specifically performed as follows.

(1) Hafnium oxide (HfO$_2$) powders having a particle size of 200 nm, nano-sized carbon black (50 nm) and silicon hexaboride (SiB$_6$) powders having a particle size of 1 μm were mixed in a molar ratio of 2:1:1 to obtain a powder mixture.

(2) The powder mixture obtained in step (1) was subjected to ball milling at 400 r/min in a planetary ball mill for 16 h to allow the HfO$_2$ powders, the nano-sized carbon black and the SiB$_6$ powders to be uniformly mixed, and then dried in an electric blast drying oven at 70° C. for 10 h, where a medium used in the ball milling was isopropanol; and a weight ratio of the powder mixture to balls of the planetary ball mill was 1:20.

(3) The reaction mixture obtained in step (2) was transferred to a graphite mold (diameter: 32 mm) covered with graphite paper, and subjected to spark plasma sintering at a temperature of 1850° C., a pressure of 60 MPa, and a vacuum degree of 0.2 mbar for 30 min to obtain the HfC(Si)—HfB$_2$ composite ceramic with a density of 99% and uniformly dispersed grains, where a heating rate was 80° C./min.

Figure 2:
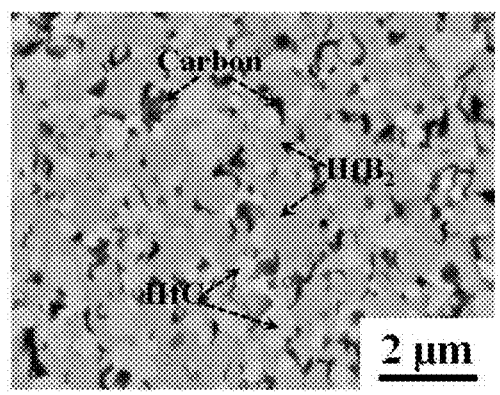
FIG. 2 is a scanning electron microscope (SEM) image of the HfC(Si)—$HfB_2$ composite ceramic prepared in Example 3.

An X-ray diffraction (XRD) pattern of the HfC(Si)—HfB$_2$ composite ceramic prepared herein was presented in FIG. 1, from which it can be seen that the main crystal phases were HfC and HfB$_2$ with good crystallinity, and there was a small amount of HfO$_2$ doped in the main crystal phases. The HfC and HfB$_2$ crystal phases were consistent with Powder Diffraction File (PDF) NO. 65-8747 and PDF NO. 65-8678, respectively. FIG. 2 was a scanning electron microscope (SEM) image of the HfC(Si)—HfB$_2$ composite ceramic prepared herein, and it can be observed that the HfC and HfB$_2$ grains with a size of about 600 nm were uniformly dispersed and the composite ceramic had relatively high density. There was a small amount of free carbon at the grain boundaries.

Example 4

Provided herein was a method for the preparation of a dense HfC(Si)—HfB$_2$ composite ceramic, which was specifically performed as follows.

(1) Hafnium oxide (HfO$_2$) powders having a particle size of 80 nm, nano-sized carbon black (50 nm) and silicon hexaboride (SiB$_6$) powders having a particle size of 1 μm were mixed in a molar ratio of 1:1:1 to obtain a powder mixture.

(2) The powder mixture obtained in step (1) was subjected to ball milling at 200 r/min in a planetary ball mill for 24 h to allow the HfO$_2$ powders, the nano-sized carbon black and the SiB$_6$ powders to be uniformly mixed, and then dried in an electric blast drying oven at 50° C. for 10 h, where a medium used in the ball milling was isopropanol; and a weight ratio of the powder mixture to balls of the planetary ball mill was 1:4.

(3) The reaction mixture obtained in step (2) was transferred to a graphite mold (diameter: 32 mm) covered with graphite paper, and subjected to spark plasma sintering at a temperature of 1500° C., a pressure of 20 MPa, and a vacuum degree of 0 mbar for 30 min to obtain the HfC(Si)—HfB$_2$ composite ceramic with a density of 94.0% and uniformly dispersed grains, where a heating rate was 50° C./min.

Example 5

Provided herein was a method for the preparation of a dense HfC(Si)—HfB$_2$ composite ceramic, which was specifically performed as follows.

(1) Hafnium oxide (HfO$_2$) powders having a particle size of 200 nm, nano-sized carbon black (50 nm) and silicon hexaboride (SiB$_6$) powders having a particle size of 4 μm were mixed in a molar ratio of 10:15:3 to obtain a powder mixture.

(2) The powder mixture obtained in step (1) was subjected to ball milling at 450 r/min in a planetary ball mill for 12 h to allow the HfO$_2$ powders, the nano-sized carbon black and the SiB$_6$ powders to be uniformly mixed, and then dried in an electric blast drying oven at 60° C. for 6 h, where a medium used in the ball milling was isopropanol; and a weight ratio of the powder mixture to balls of the planetary ball mill was 1:12.

(3) The reaction mixture obtained in step (2) was transferred to a graphite mold (diameter: 32 mm) covered with graphite paper, and subjected to spark plasma sintering at a temperature of 1650° C., a pressure of 40 MPa, and a vacuum degree of 0.5 mbar for 20 min to obtain the HfC(Si)—HfB$_2$ composite ceramic with a density of 98% and uniformly dispersed grains, where a heating rate was 100° C./min.

Example 6

Provided herein was a method for the preparation of a dense HfC(Si)—HfB$_2$ composite ceramic, which was specifically performed as follows.

(1) Hafnium oxide (HfO$_2$) powders having a particle size of 500 nm, nano-sized carbon black (50 nm) and silicon hexaboride (SiB$_6$) powders having a particle size of 5 μm were mixed in a molar ratio of 8:20:5 to obtain a powder mixture.

(2) The powder mixture obtained in step (1) was subjected to ball milling at 500 r/min in a planetary ball mill for 6 h to allow the HfO$_2$ powders, the nano-sized carbon black and the SiB$_6$ powders to be uniformly mixed, and then dried in an electric blast drying oven at 80° C. for 4 h, where a medium used in the ball milling was isopropanol; and a weight ratio of the powder mixture to balls of the planetary ball mill was 1:20.

(3) The reaction mixture obtained in step (2) was transferred to a graphite mold (diameter: 32 mm) covered with graphite paper, and subjected to spark plasma sintering at a temperature of 1850° C., a pressure of 60 MPa, and a vacuum degree of 1.0 mbar for 5 min to obtain the HfC(Si)—HfB$_2$ composite ceramic with a density of 100% and uniformly dispersed grains, where a heating rate was 200° C./min.

These embodiments are merely illustrative of the technical solutions of the disclosure, and are not intended to limit the disclosure. It should be understood that modifications, changes and improvements made by those skilled in the art without departing from the spirit of the disclosure should fall within the scope of the disclosure defined by the appended claims.

What is claimed is:

1. A method for the preparation of a HfC(Si)—HfB$_2$ composite ceramic, comprising:
   1) mixing hafnium oxide powders, nano-sized carbon black and silicon hexaboride powders in a molar ratio of (1-10):(1-20):(1-5) to obtain a powder mixture;
   2) subjecting the powder mixture obtained in step (1) to ball milling to obtain a ball-milled product; and drying the ball-milled product to obtain a dried product;
   3) transferring the dried product to a graphite mold followed by spark plasma sintering to obtain the HfC(Si)—HfB$_2$ composite ceramic with uniformly dispersed grains.

2. The method of claim 1, wherein in step (1), a particle size of the hafnium oxide powders is 50-500 nm; a particle size of the nano-sized carbon black is 50 nm; and a particle size of the silicon hexaboride powders is 1-5 μm.

3. The method of claim 1, wherein in step (2), the ball milling is performed in a planetary ball mill.

4. The method of claim 1, wherein in step (2), a medium used in the ball milling is isopropanol.

5. The method of claim 1, wherein in step (2), a weight ratio of the powder mixture to balls of the planetary ball mill is 1:(4-20).

6. The method of claim 3, wherein in step (2), the ball milling is performed at 200-500 r/min for 6-24 h.

7. The method of claim 1, wherein in step (2), the ball-milled product is dried in an electric blast drying oven at 50-80° C. for 4-10 h.

8. The method of claim 1, wherein in step (3), the graphite mold is covered with a graphite paper.

9. The method of claim 1, wherein in step (3), the spark plasma sintering is performed at a temperature of 1500-1850° C., a pressure of 20-60 MPa and a vacuum degree of 0-1.0 mbar for 5-30 min; and a heating rate is 50-200° C./min.

10. The method of claim 1, wherein in step (3), the spark plasma sintering is performed at 1500-1850° C.

* * * * *